(12) United States Patent
Park et al.

(10) Patent No.: US 6,960,891 B2
(45) Date of Patent: Nov. 1, 2005

(54) DIRECT-TYPE BACK LIGHT DEVICE

(75) Inventors: Deuk Il Park, Suwon-si (KR); Choong Yop Rhew, Suwon-si (KR)

(73) Assignee: LS Tech Co., LTD, (KR)

( * ) Notice: Subject to any disclaimer, the term of this patent is extended or adjusted under 35 U.S.C. 154(b) by 0 days.

(21) Appl. No.: 10/812,805

(22) Filed: Mar. 29, 2004

(65) Prior Publication Data
US 2005/0127848 A1 Jun. 16, 2005

(30) Foreign Application Priority Data
Dec. 12, 2003 (KR) .................. 10-2003-0090728

(51) Int. Cl.[7] ............................................. H05B 37/00
(52) U.S. Cl. .............. 315/229; 315/227 R; 315/209 R; 315/291; 345/102; 349/64; 349/67
(58) Field of Search ..................... 315/241 R, 227 R, 315/246, 232, 209 R, 244, 291, 229; 349/64, 349/67, 70, 112, 113; 345/87, 102, 905; 362/608, 362/609, 245, 246, 260, 560

(56) References Cited

U.S. PATENT DOCUMENTS

| | | | |
|---|---|---|---|
| 5,420,481 A * | 5/1995 | McCanney | 315/291 |
| 5,914,560 A * | 6/1999 | Winsor | 313/493 |
| 6,177,768 B1 * | 1/2001 | Kamata et al. | 315/241 R |
| 6,295,110 B1 * | 9/2001 | Ohe et al. | 349/124 |
| 6,586,863 B2 * | 7/2003 | Kim et al. | 310/359 |
| 6,796,678 B2 * | 9/2004 | Moon | 362/225 |
| 6,843,584 B2 * | 1/2005 | Bang et al. | 362/249 |
| 2005/0134183 A1 * | 6/2005 | Park et al. | 315/58 |

* cited by examiner

Primary Examiner—Haissa Philogene
(74) Attorney, Agent, or Firm—Schmeiser Olsen & Watts, LLP (57) ABSTRACT

The object of this invention is to provide a direct-type back light device, capable of maintaining uniform luminance, and reducing manufacturing costs and power consumption, in addition to being easy to assemble and to accomplish thinness. The back light device includes a frame, a diffusion member provided in an upper portion of the frame to diffuse light, a plurality of fluorescent lamps provided under the diffusion member to radiate the light, a reflection member provided under the plurality of fluorescent lamps to reflect the light radiated from the fluorescent lamps, a lamp holder to hold each of the plurality of fluorescent lamps, an inverter to turn on or off the plurality of fluorescent lamps, and a capacitive circuit element and an insulator provided on first and second ends of the fluorescent lamps, respectively, to connect the plurality of the fluorescent lamps to the inverter in parallel with each other. The capacitive circuit element includes along a first surface thereof a first common electrode to be connected to a first end of the inverter, and a plurality of independent electrodes along a second surface thereof to be connected to the first ends of the fluorescent lamps. The insulator has along a surface thereof a second common electrode to be connected to the second end of each of the fluorescent lamps and to a second end of the inverter.

4 Claims, 8 Drawing Sheets

DIRECT-TYPE BACK LIGHT DEVICE

BACKGROUND OF THE INVENTION

1. Field of the Invention

The present invention relates generally to direct-type back light devices, and more particularly, to a direct-type back light device, which is capable of maintaining uniform luminance, and reducing manufacturing costs and power consumption, in addition to being easy to assemble and to accomplish thinness.

2. Description of the Related Art

A liquid crystal display (LCD) is an electric element which converts several electric signals indicative of information produced from various units into visual signals using a transmittance of liquid crystal which is changed in response to an applied voltage, prior to transmitting visual information to a person. Since the LCD itself cannot emit light to produce images, the LCD must be provided with a back light device. The images are produced on the LCD by light radiated from the back light device.

There is a growing tendency for a back light device which has high and uniform luminance, and is low in power consumption and manufacturing costs thereof, and has a thin structure due to a compact arrangement of parts.

Figure 1:
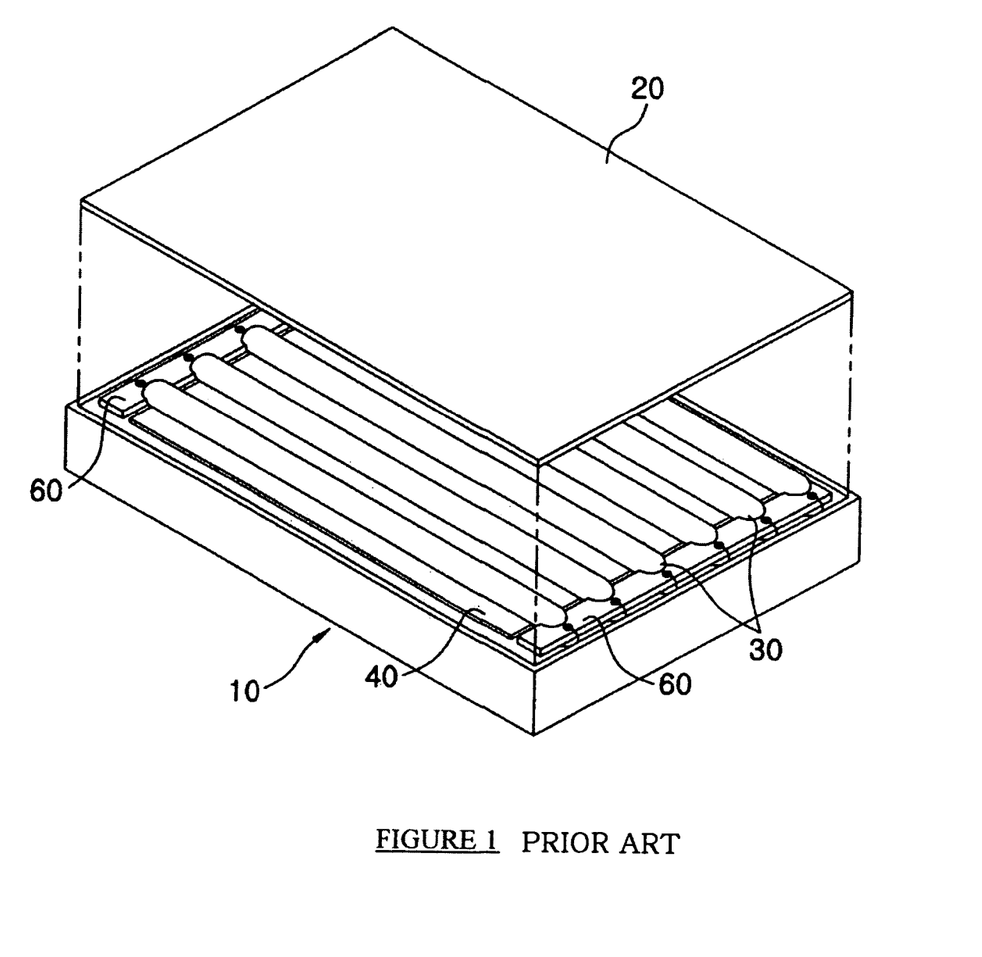
FIG. 1 is a perspective view of a conventional direct-type back light device, when a diffusion member is separated from a frame of the back light device.
Figure 2:
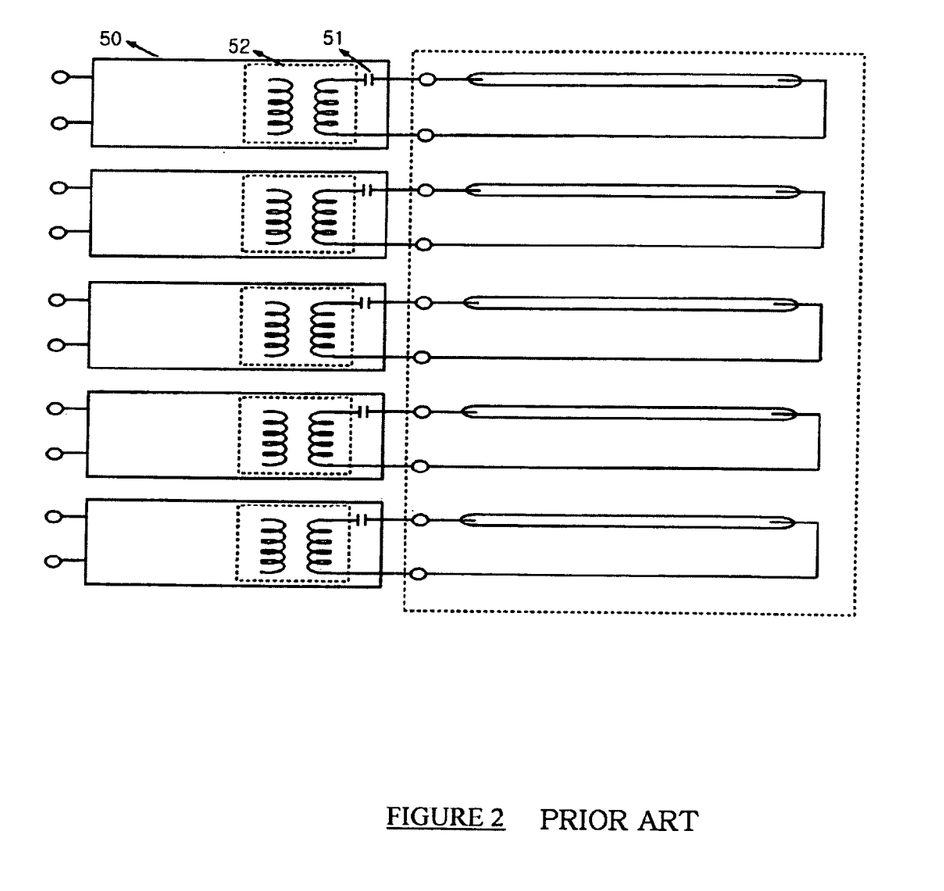
FIG. 2 is a view to show an arrangement of fluorescent lamps and inverters included in the direct-type back light device of FIG. 1.

FIG. 1 is a perspective view of a conventional direct-type back light device, when a diffusion member is separated from a frame of the back light device. FIG. 2 is a view to show an arrangement of cold cathode fluorescent lamps and inverters included in the direct-type back light device of FIG. 1.

As shown in FIGS. 1 and 2, the direct-type back light device includes a frame 10. A diffusion member 20, a plurality of cold cathode fluorescent lamps 30 which will be referred to as a fluorescent lamp hereinafter, and a reflection member 40 are provided in the frame 10 to be superposed on each other. Both ends of each fluorescent lamp 30 are connected in series, to a capacitor 51 which is provided on an output end of each of inverters 50. Thus, when alternating voltage is applied to each of the inverters 50, the applied alternating voltage is boosted in a transformer 52 provided in each of the inverters 50, and then is supplied to each fluorescent lamp 30 which is connected to each of the capacitors 51 in series.

Each fluorescent lamp 30 radiates light by the alternating voltage supplied to the fluorescent lamp 30. The light is reflected by the reflecting member 40. The radiated and reflected light is uniformly distributed over a panel (not shown) of the LCD through the diffusion member 20, thus producing images on the LCD.

However, because the conventional direct-type back light device is constructed so that the plurality of inverters are connected to the plurality of fluorescent lamps in series, the conventional direct-type back light device has a problem as follows.

The conventional direct-type back light device has a problem in that it is impossible to manufacture the inverters connected to the fluorescent lamps in series so that the transformers provided in the inverters have the same boosting ratio, thus there exists difference between the boosting voltages of the inverters. Due to such difference of the boosting voltages, electrostatic capacities of the capacitors are different from each other, thus reducing uniformity of the luminance of the back light device.

The conventional direct-type back light device has another problem in that the number of the inverters is increased as the number of the fluorescent lamps is increased, in case where the inverters are connected to the fluorescent lamps in series, thus increasing manufacturing costs, and increasing power consumption due to the use of a large number of inverters.

The conventional direct-type back light device has a further problem in that a large number of inverters are mounted to a lower surface of the reflection member, so that it is difficult to handle leads which connect the inverters to the fluorescent lamps and thereby it is difficult to assemble the product. Recently, because a large-sized LCD has been developed, the above-mentioned problems become more serious.

SUMMARY OF THE INVENTION

Accordingly, the present invention has been made keeping in mind the above problems occurring in the prior art, and an object of the present invention is to provide a direct-type back light device which is constructed so that a plurality of fluorescent lamps are connected to a single invert in parallel with each other by a capacitive circuit element, thus boosting voltages supplied to the fluorescent lamps in the same boosting ratio and thereby equalizing capacitance of a capacitor, therefore maintaining uniform luminance.

Another object of the present invention is to provide a direct-type back light device which is constructed so that a plurality of fluorescent lamps are turned on or off using a single inverter, thus reducing manufacturing costs and power consumption.

A further object of the present invention is to provide a direct-type back light device which is constructed so that leads extending from both ends of each of fluorescent lamps are directly connected to an independent electrode and a common electrode which are provided on the both ends of the fluorescent lamp, thus being easy to handle the leads. Further, the direct-type back light device uses a single inverter, thus being easy to assemble and reducing costs of the product.

In order to accomplish the above object, the present invention provides a direct-type back light device, including a frame, a diffusion member provided in an upper portion of the frame to diffuse light, thus allowing the light to be uniformly radiated, a plurality of fluorescent lamps provided under the diffusion member to radiate the light, a reflection member provided under the plurality of fluorescent lamps to reflect the light radiated from the fluorescent lamps, a lamp holder to hold each of the plurality of fluorescent lamps, an inverter to turn on or off the plurality of fluorescent lamps and a capacitive circuit element and an insulator provided on first and second ends of the fluorescent lamps, respectively, to connect the plurality of the fluorescent lamps to the inverter in parallel with each other. In this case, the capacitive circuit element includes a first common electrode provided along a first surface of the capacitive circuit element to be connected to a first end of the inverter, and a plurality of independent electrodes provided along a second surface of the capacitive circuit element, with each of the independent electrodes being connected to the first end of each of the fluorescent lamps. The insulator has, along a surface thereof, a second common electrode to be connected to the second end of each of the fluorescent lamps, with the second common electrode being connected to a second end of the inverter.

The capacitive circuit element serves as a capacitor.

The number of the inverter is one.

The capacitive circuit element may be fabricated to have a shape of a cylinder, a square pipe, or a coaxial cable.

Further, the present invention provides a direct-type back light device, including a frame, a diffusion member provided in an upper portion of the frame to diffuse light, thus allowing the light to be uniformly radiated, a plurality of fluorescent lamps provided under the diffusion member to radiate the light, a reflection member provided under the plurality of fluorescent lamps to reflect the light radiated from the fluorescent lamps, a lamp holder to hold each of the plurality of fluorescent lamps, an inverter to turn on or off the plurality of fluorescent lamps, and a pair of first and second capacitive circuit elements each comprising an insulator and provided on first and second ends of the fluorescent lamps, respectively, to connect the plurality of the fluorescent lamps to the inverter in parallel with each other. Each of the first and second capacitive circuit elements includes a common electrode provided along a first surface thereof to be connected to each of both ends of the inverter, and a plurality of independent electrodes provided along a second surface thereof to be connected to each of the first and second ends of each of the fluorescent lamps.

The pair of capacitive circuit elements serve as a capacitor.

The number of the inverter is one.

Each of the capacitive circuit element may be fabricated to have a shape of a cylinder, a square pipe, or a coaxial cable.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, embodiments of the present invention will be described in detail with reference to the attached drawings.

Reference now should be made to the drawings, in which the same reference numerals are used throughout the different drawings to designate the same or similar components.

Figure 3:
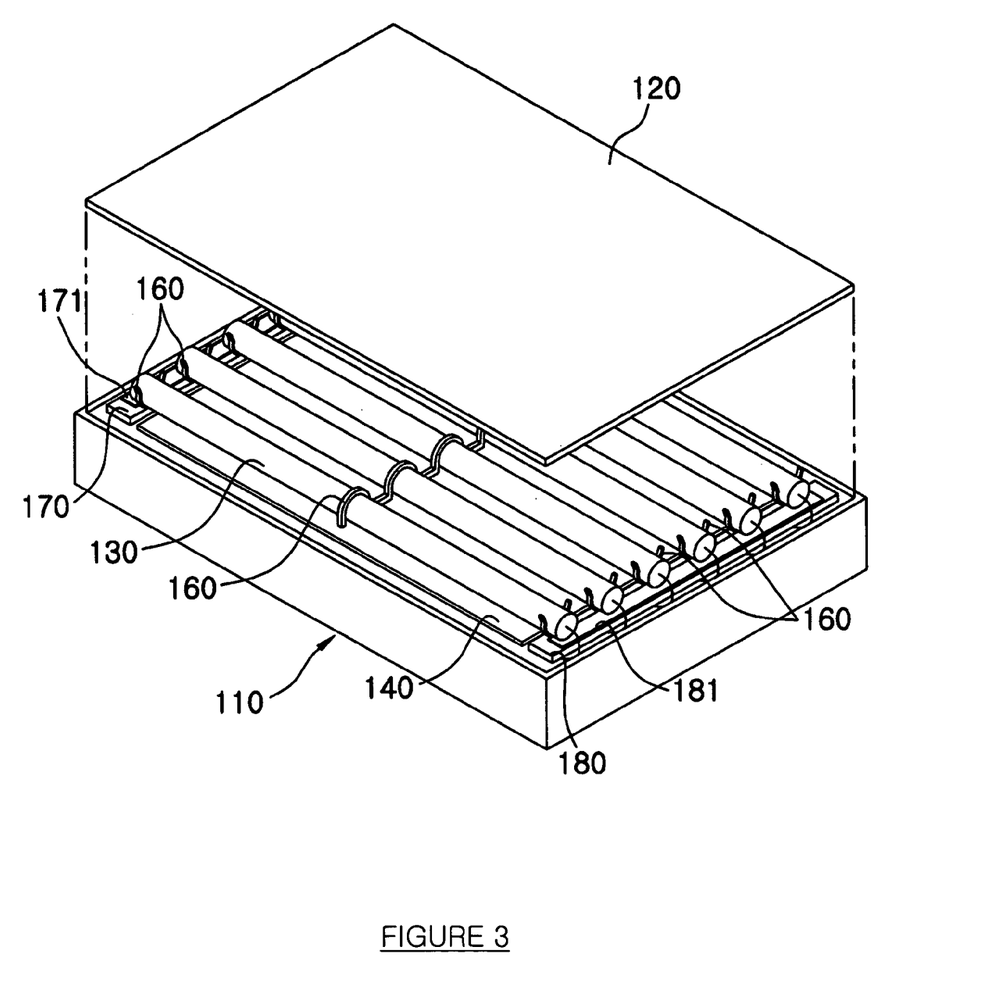
FIG. 3 is a perspective view of a direct-type back light device, according to the present invention.
Figure 4:
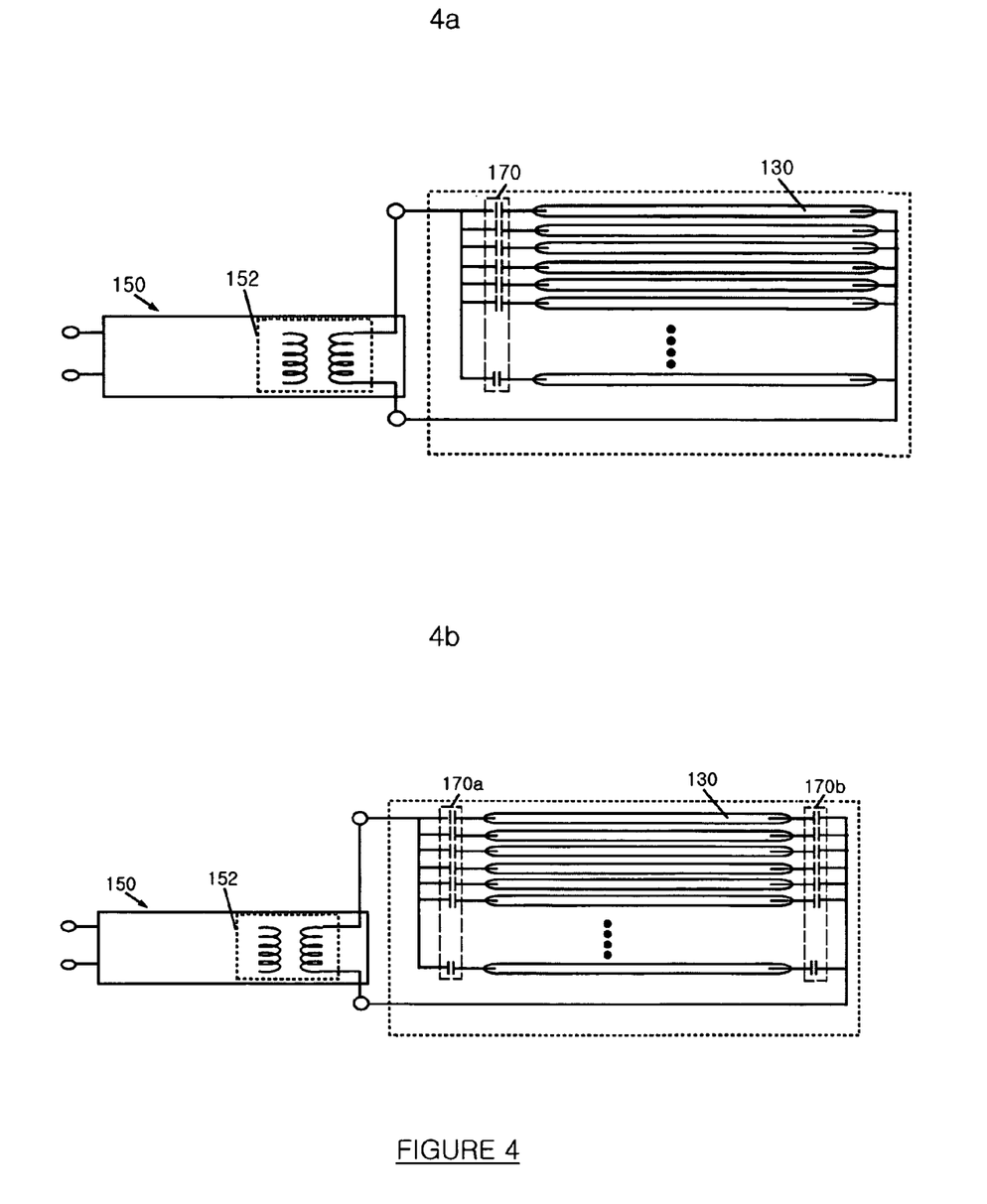
FIGS. 4a and 4b are views to show two different parallel connections of a plurality of fluorescent lamps and a single inverter which are included in the direct-type back light device of FIG. 3.
Figure 5:
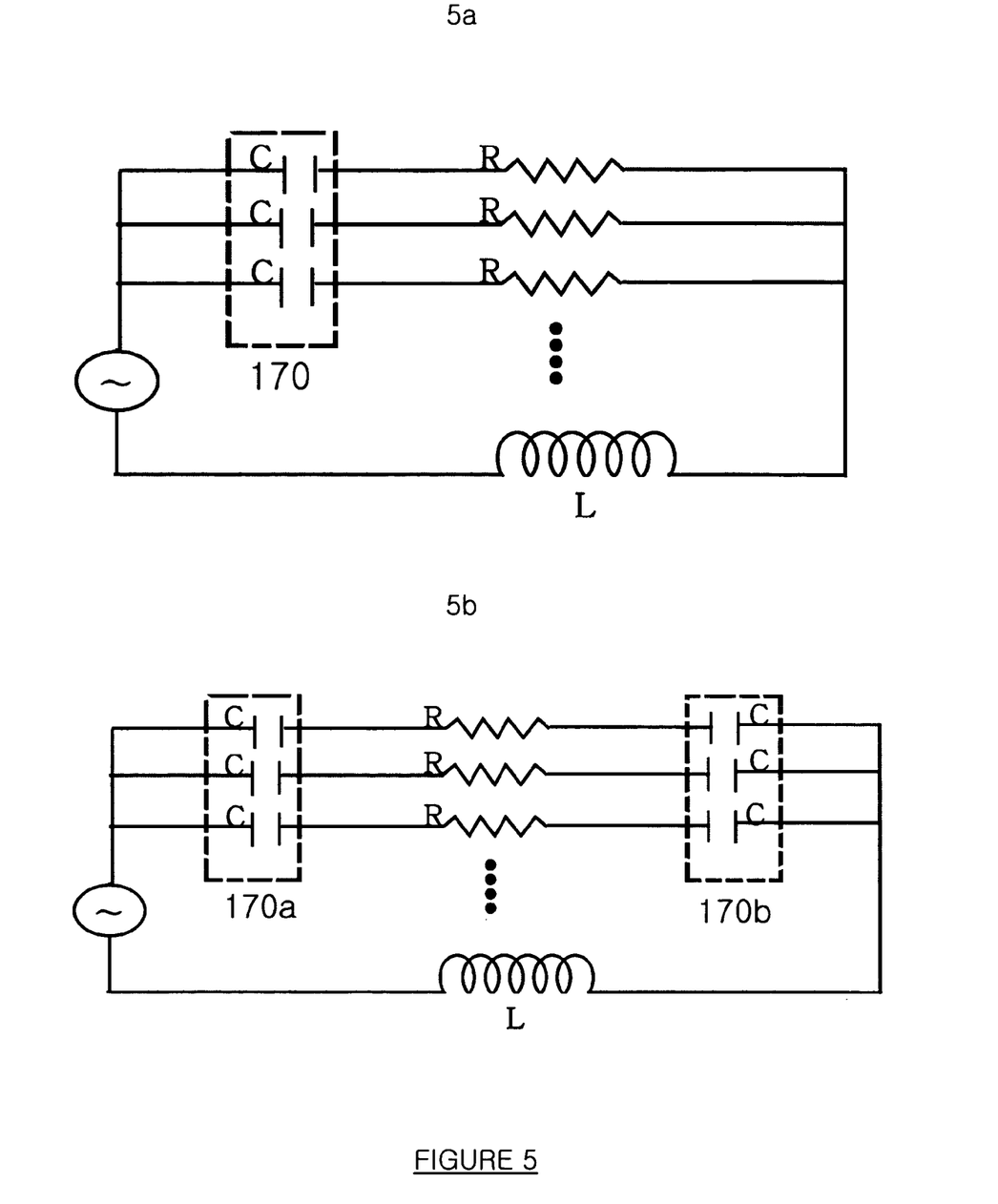
FIGS. 5a and 5b are equivalent circuit diagrams corresponding to FIGS. 4a and 4b, respectively.
Figure 6A:
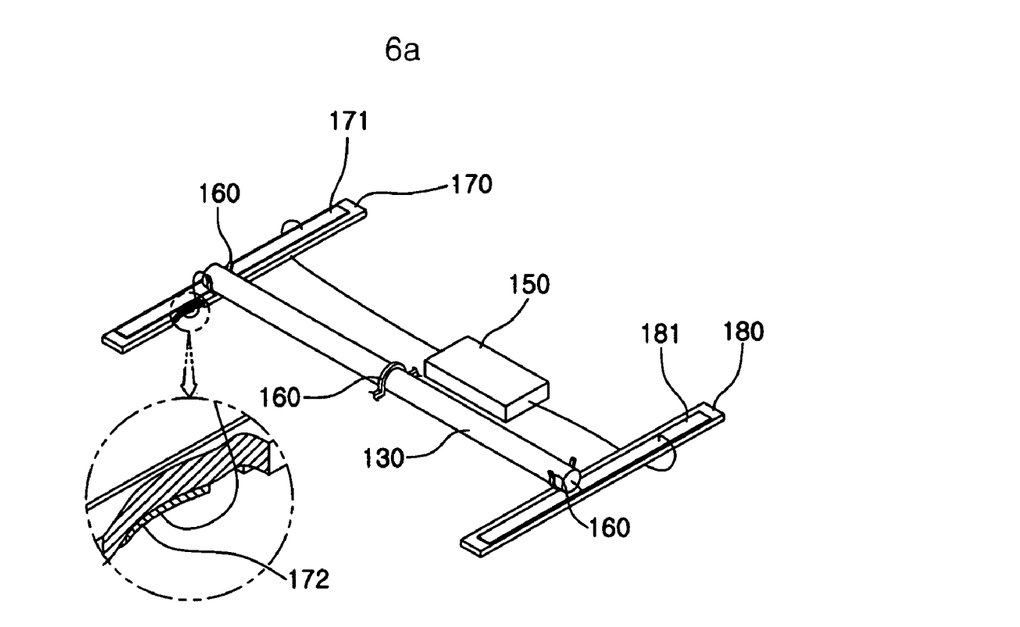
FIGS. 6a and 6b are perspective views to show two different parallel connections of the plurality of fluorescent lamps and the single inverter which are included in the direct-type back light device of FIG. 3.

FIG. 3 is a perspective view of a direct-type back light device, according to the present invention. FIGS. 4a and 4b are views to show two different parallel connections of a plurality of fluorescent lamps and a single inverter which are included in the direct-type back light device of FIG. 3. FIGS. 5a and 5b are equivalent circuit diagrams corresponding to FIGS. 4a and 4b, respectively. FIG. 6a is a perspective view to show a parallel connection of the plurality of fluorescent lamps and the single inverter which are included in the direct-type back light device of FIG. 3.

Referring to FIGS. 3, 4a, 4b, 5a, 5b, and 6a, the back light device of this invention includes a frame 110. A diffusion member 120, a plurality of fluorescent lamps 130, and a reflection member 140 are sequentially installed in the frame 110 from the top to the bottom. The plurality of fluorescent lamps 130 are firmly held at the central portions thereof by a lamp holder 160 which is provided along a center of an upper surface of the reflection member 140. The lamp holder 160 is made of a transparent material to pass the light radiated from the plurality of fluorescent lamps 130. Furthermore, another lamp holder 160 is provided along an upper surface of each of a pair of capacitive circuit elements 170 and 180 to hold the ends of the plurality of fluorescent lamps 130.

Further, an inverter 150 is installed in the frame 110, and is connected to the plurality of fluorescent lamps 130 to turn on or off the fluorescent lamps 130. In this case, the single inverter 150 is connected to the plurality of fluorescent lamps 130 in parallel with each other.

In a detailed description, a first common electrode 171 is attached to a first surface of an insulator and independent electrodes 172 are attached to a second surface of the insulator, thus providing the capacitive circuit element 170, serving as a capacitor, on a first end of each of the fluorescent lamps 130. Further, an insulator 180, having along a surface thereof a second common electrode 181, is provided on a second end of each of the fluorescent lamps 130. Thereafter, the first end of each fluorescent lamp 130 is connected to an associated independent electrode 172 provided on the second surface of the capacitive circuit element 170 using leads. The second common electrode 181 provided on a surface of the insulator 180 is connected to the second ends of the fluorescent lamps 130 using leads. The first common electrode 171 provided on the first surface of the capacitive circuit element 170 and the second common electrode 181 provided on a surface of the insulator 180 are connected to both ends of the inverter 150, respectively, thus connecting the fluorescent lamps 130 to the inverter 150 in parallel with each other.

Further, the capacitive circuit element 170 limits a current to a predetermined value, thus preventing a discharge current flowing in the fluorescent lamps 130 from being unexpectedly increased, therefore preventing the fluorescent lamps 130 from melting or preventing the inverter 150 from being broken.

When using the capacitive circuit element 170, the most important point is the correlation between a capacitance value and a breakdown voltage of the capacitive circuit element 170. The reason why the correlation between the capacitance value and the breakdown voltage of the capacitive circuit element 170 must be considered is that the luminance and power consumption of the back light device are changed depending on the current flowing in the fluorescent lamps 130 and the output voltage and frequency of the inverter 150. In this case, the breakdown voltage of the capacitive circuit element 170 is controlled by the output power of the inverter 150. Thus, when the output power is higher than the breakdown voltage of the capacitive circuit element 170, the capacitive circuit element 170 is broken, thus causing the excessive amount of current to flow in the fluorescent lamps 130.

Therefore, a dielectric strength, a dielectric constant, and a thickness of the insulator used in the capacitive circuit element 170 are determined considering the voltage of the inverter 150. It is preferable to use the insulator whose breakdown voltage is twice as high as the output power of the inverter 150.

Further, the inverter 150 is connected to the fluorescent lamps 130 in parallel with each other, so that the number of the inverter 150 is limited to one, thus increasing efficiency of the inverter 150, maintaining uniform luminanence, preventing operational reliability of the back light device from being deteriorated, and reducing manufacturing costs.

Further, as shown in FIGS. 4b and 5b, a pair of capacitive circuit elements 170a and 170b may be used to connect the inverter 150 to the fluorescent lamps 130 in parallel with each other. Since the general construction of FIG. 4b remains the same as FIG. 4a, except that the capacitive circuit element 170b is used in place of the insulator 180, the back light device of FIG. 4b will not be described in detail herein.

Figure 6B:
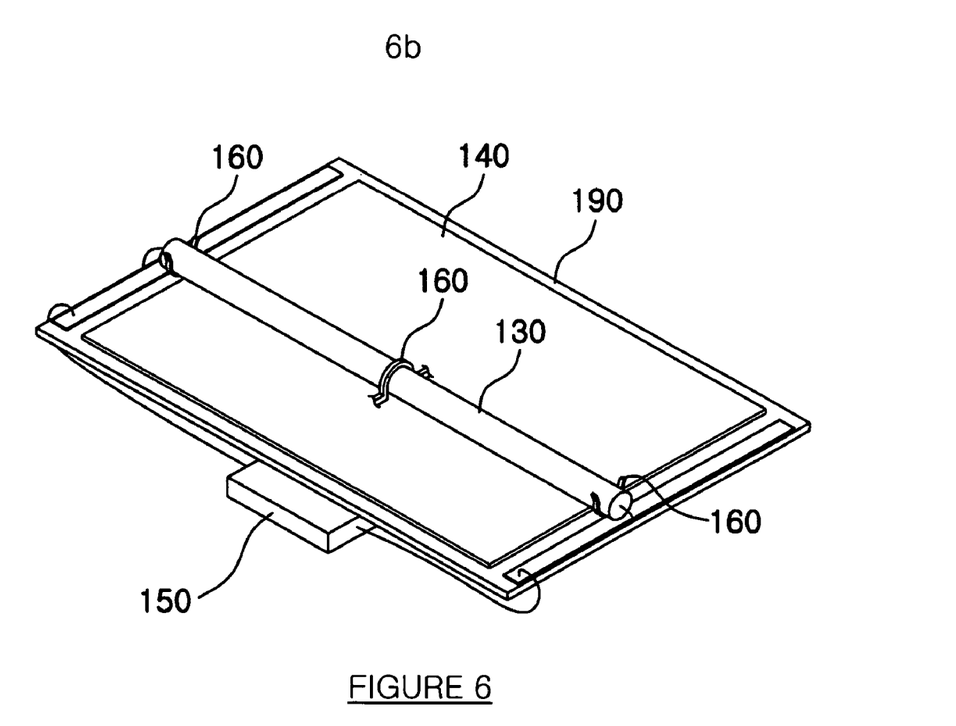

FIG. 6b is a perspective view to show another parallel connection of the plurality of fluorescent lamps and the single inverter which are included in the direct-type back light device of FIG. 3.

As shown in FIG. 6b, a capacitive circuit element and an insulator, which are used to connect the inverter 150 to the fluorescent lamps 130 in parallel with each other, are integrated with each other into a plate-shaped structure. In this case, the inverter 150 is placed to an outside of the plate-shaped structure. However, the inverter 150 may be placed in the plate-shaped structure, thus accomplishing thinness of the back light device, and reducing manufacturing costs.

Figure 7:
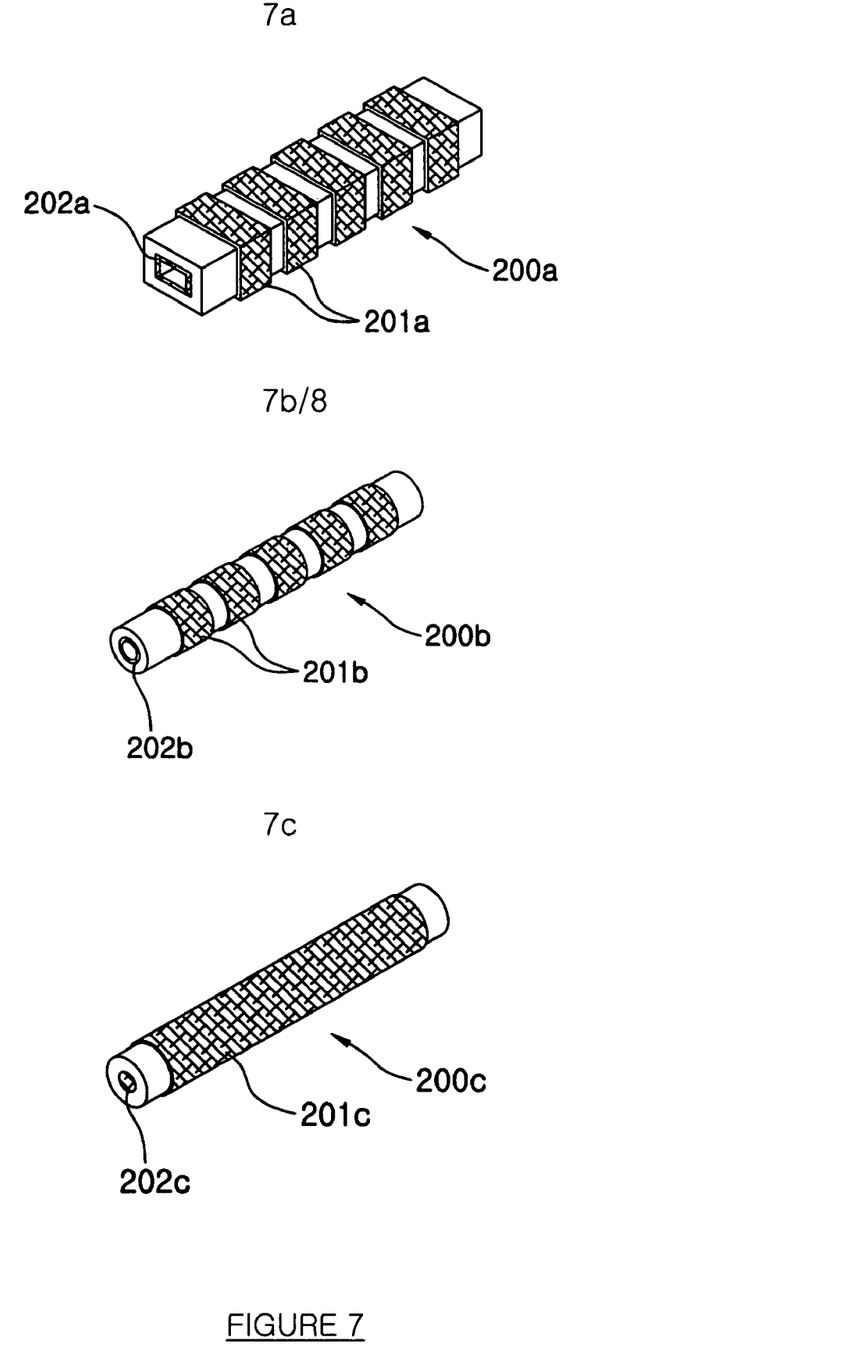
FIGS. 7a, 7b, and 7c are perspective views to show three modifications of a capacitive circuit element, serving as a capacitor, of the direct-type back light device of FIG. 3.

FIGS. 7a, 7b, and 7c are perspective views to show three modifications of the capacitive circuit element, serving as a capacitor, of the direct-type back light device of FIG. 3.

Referring to FIG. 7a, a capacitive circuit element 200a has a shape of a square pipe. A plurality of independent electrodes 201a are provided on an outer surface of the capacitive circuit element 200a, while a common electrode 202a is provided along an inner surface of the capacitive circuit element 200a. Further, as shown in FIG. 7b, a capacitive circuit element 200b has a cylindrical shape. A plurality of independent electrodes 201b are provided on an outer circumferential surface of the capacitive circuit element 200b, while a common electrode 202b is provided on an inner circumferential surface of the capacitive circuit element 200b.

As shown in FIG. 7c, a capacitive circuit element 200c has a shape of a coaxial cable. An independent electrode 201c is attached to an outer circumferential surface of the capacitive circuit element 200c, and a common electrode 202c is installed in the capacitive circuit element 200c.

Such a capacitive circuit element 200a, 200b, 200c allows one of a pair of capacitive circuit elements to have only a common electrode. Further, a material having a high dielectric constant, such as a ceramic insulator, may be used to reduce a size of the product.

Meanwhile, the capacitive circuit element 200c having the shape of the coaxial cable may be arranged on a lower surface of the frame 110 in a longitudinal direction of each fluorescent lamp 130, thus accomplishing the thinness of the direct-type back light device.

Figure 8:
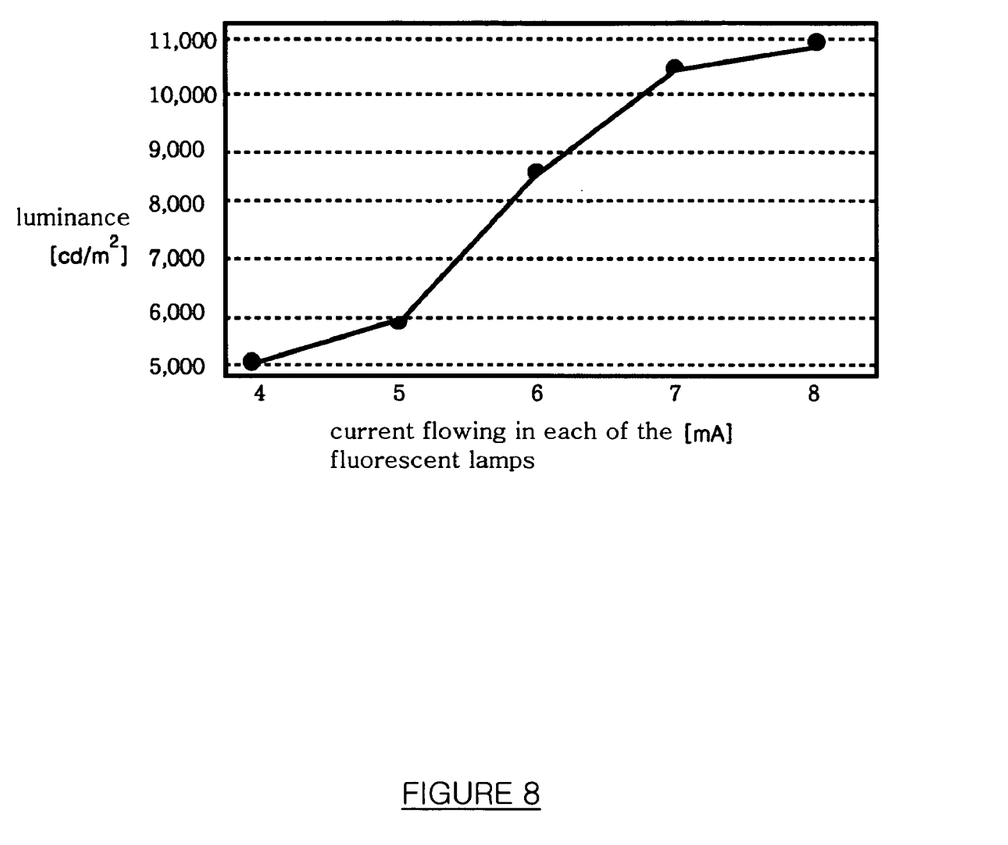
FIG. 8 is a graph to show luminance of the back light device as a function of a current flowing in each of the fluorescent lamps of the back light device of FIG. 3.

FIG. 8 is a graph to show luminance of the back light device as a function of a current flowing in each of the fluorescent lamps of the back light device of FIG. 3.

FIG. 8 shows a luminous intensity as a function of the variance of a current of each fluorescent lamp, based on an experiment executed when twenty fluorescent lamps each having the length of 535 mm and the outer diameter of 2.4 mm are connected to the single inverter in parallel by the capacitive circuit element.

Even when twenty fluorescent lamps are turned on or off by the single inverter, high luminance can be accomplished relative to the current, thus reducing manufacturing costs and power consumption, different form the conventional method where the fluorescent lamps are turned on or off by several inverters.

As described above, the present invention provides a back light device which is constructed so that a plurality of fluorescent lamps are connected to a single inverter in parallel with each other by a capacitive circuit element, thus keeping the luminance of back light uniform, and reducing manufacturing costs and power consumption.

Further, according to the present invention, leads extending from both ends of each fluorescent lamp are directly connected to an independent electrode and a common electrode which are respectively provided on the both ends of the fluorescent lamp, thus being easy to handle the leads. Further, the back light device of this invention uses a single inverter, thus being easy to assemble and reducing costs of the product.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A direct-type back light device, comprising:
   a frame;
   a diffusion member provided in an upper portion of the frame to diffuse light, thus allowing the light to be uniformly radiated;
   a plurality of fluorescent lamps provided under the diffusion member to radiate the light;
   a reflection member provided under the plurality of fluorescent lamps to reflect the light radiated from the fluorescent lamps;
   a lamp holder to hold each of the plurality of fluorescent lamps;
   an inverter to turn on or off the plurality of fluorescent lamps; and
   a capacitive circuit element and an insulator provided on first and second ends of the fluorescent lamps, respectively, to connect the plurality of the fluorescent lamps to the inverter in parallel with each other, the capacitive circuit element comprising:
      a first common electrode provided along a first surface of the capacitive circuit element to be connected to a first end of the inverter; and
      a plurality of independent electrodes provided along a second surface of the capacitive circuit element, with each of the independent electrodes being connected to the first end of each of the fluorescent lamps, and
   the insulator having, along a surface thereof, a second common electrode to be connected to the second end of each of the fluorescent lamps, with the second common electrode being connected to a second end of the inverter.

2. A direct-type back light device, comprising:
   a frame;
   a diffusion member provided in an upper portion of the frame to diffuse light, thus allowing the light to be uniformly radiated;
   a plurality of fluorescent lamps provided under the diffusion member to radiate the light;

a reflection member provided under the plurality of fluorescent lamps to reflect the light radiated from the fluorescent lamps;

a lamp holder to hold each of the plurality of fluorescent lamps;

an inverter to turn on or off the plurality of fluorescent lamps; and a pair of first and second capacitive circuit elements each comprising an insulator and provided on first and second ends of the fluorescent lamps, respectively, to connect the plurality of the fluorescent lamps to the inverter in parallel with each other, each of the first and second capacitive circuit elements comprising:

a common electrode provided along a first surface of each of the first and second capacitive circuit elements to be connected to each of both ends of the inverter; and a plurality of independent electrodes provided along a second surface of each of the first and second capacitive circuit elements to be connected to each of the first and second ends of each of the fluorescent lamps.

3. The direct-type back light device according to claim 1, wherein the capacitive circuit element has a shape of a cylinder, a square pipe, or a coaxial cable.

4. The direct-type back light device according to claim 2, wherein the capacitive circuit element has a shape of a cylinder, a square pipe, or a coaxial cable.

* * * * *